(12) United States Patent
Aufranc et al.

(10) Patent No.: US 11,674,420 B2
(45) Date of Patent: Jun. 13, 2023

(54) HEATING MEMBER FOR A VEHICLE EXHAUST GAS PURIFICATION DEVICE

(71) Applicant: FAURECIA SYSTEMES D'ECHAPPEMENT, Nanterre (FR)

(72) Inventors: Guillaume Aufranc, Courcelles-les-Montbeliard (FR); Christophe Tournier, Etouvans (FR); Xavier Bartolo, Etouvans (FR)

(73) Assignee: FAURECIA SYSTEMES D'ECHAPPEMENT

( * ) Notice: Subject to any disclaimer, the term of this patent is extended or adjusted under 35 U.S.C. 154(b) by 35 days.

(21) Appl. No.: 17/439,027

(22) PCT Filed: Mar. 18, 2020

(86) PCT No.: PCT/EP2020/057372
§ 371 (c)(1),
(2) Date: Sep. 14, 2021

(87) PCT Pub. No.: WO2020/187957
PCT Pub. Date: Sep. 24, 2020

(65) Prior Publication Data
US 2022/0154616 A1     May 19, 2022

(30) Foreign Application Priority Data
Mar. 20, 2019   (FR) ..................................... 19 02865

(51) Int. Cl.
*F01N 3/20*       (2006.01)
*F01N 3/18*       (2006.01)
(52) U.S. Cl.
CPC .................................. *F01N 3/2013* (2013.01)

(58) Field of Classification Search
CPC .... F01N 3/2013; F01N 3/2882; F01N 3/2006; F01N 13/1872; F01N 5/02;
(Continued)

(56) References Cited

U.S. PATENT DOCUMENTS 5,317,869 A     6/1994  Takeuchi
5,861,611 A  *  1/1999  Kato ..................... F01N 3/2875
                                                      219/205
(Continued)

FOREIGN PATENT DOCUMENTS

CN     108691617 A    10/2018
DE      10111310 A1    9/2002
(Continued)

OTHER PUBLICATIONS

International Search Report and Written Opinion for PCT/EP2020/057372 dated Apr. 8, 2020.
(Continued)

*Primary Examiner* — Audrey B. Walter
*Assistant Examiner* — Dapinder Singh
(74) *Attorney, Agent, or Firm* — Carlson, Gaskey & Olds, P.C.

(57) ABSTRACT

A heating member for a vehicle exhaust gas purification device includes an electrically conductive outer peripheral frame that has a geometric center and is symmetrical about an axis. An electrically conductive central support is centered on the geometric center, and a perforated heating grid is centered on the geometric center. The heating grid extends between the electrically conductive central support and the electrically conductive outer peripheral frame. The heating grid is formed of a plurality of strands connected by nodes, with the plurality of strands delimiting openings therebetween.

13 Claims, 5 Drawing Sheets

(58) Field of Classification Search
CPC ............. F01N 2530/04; F01N 2530/06; F01N 2240/16; Y02A 50/20; Y02T 10/12
See application file for complete search history.

(56) References Cited

U.S. PATENT DOCUMENTS

| | | | |
|---|---|---|---|
| 11,480,086 B2* | 10/2022 | Richard | ................ F01N 3/2026 |
| 11,486,285 B2* | 11/2022 | Kurpejovic | ............ F01N 3/2013 |
| 2010/0126984 A1 | 5/2010 | Konieczny et al. | |
| 2018/0291787 A1 | 10/2018 | Bartolo | |
| 2018/0291790 A1 | 10/2018 | Bartolo | |
| 2019/0234266 A1* | 8/2019 | Bartolo | ................... F01N 3/027 |

FOREIGN PATENT DOCUMENTS

| | | |
|---|---|---|
| DE | 102014111310 A1 | 2/2016 |
| JP | S58124012 A | 7/1983 |
| JP | H07171928 A | 7/1995 |

OTHER PUBLICATIONS

Preliminary Search Report for French Application No. 19 02865 dated Dec. 9, 2019.

* cited by examiner

HEATING MEMBER FOR A VEHICLE EXHAUST GAS PURIFICATION DEVICE

CROSS-REFERENCE TO RELATED APPLICATIONS

This application is the US national phase of PCT/EP2020/057372, which was filed on Mar. 18, 2020, which claims priority to FR 19 02865, filed Mar. 20, 2019.

FIELD OF THE DISCLOSURE

The present disclosure relates to a heating member for a vehicle exhaust gas purification device.

Exhaust lines of vehicles equipped with internal combustion engines typically include catalytic purification members, for example to convert NOx, CO, and hydrocarbons into $N_2$, $CO_2$, and $H_2O$. Such devices are only effective when the catalytic material is at a minimum temperature.

BACKGROUND

For this purpose, purification devices have been developed which incorporate a heating member mounted opposite the upstream side of a purification member, so that the purification member is heated in an accelerated manner when the vehicle is started. FR 3 065 027 A1 describes such a purification device, in which the heating member is formed by a plurality of intersecting heating wires mounted between a peripheral frame and a central support.

However, the existing heating members are not fully satisfactory. This is because the increased temperature of the heating grid causes radial thermal expansion, which can cause the wires to be compressed, resulting in short circuits and hot spots. Such hot spots lead to significant brittleness which can cause the heating grid to break.

SUMMARY

The disclosure provides a heating member with increased durability and performance of such heating members.

To this end, in one exemplary embodiment, the disclosure relates to a heating member for a vehicle exhaust gas purification device comprising: an electrically conductive outer peripheral frame, having a geometric center and symmetrical about an axis; an electrically conductive central support, centered on the geometric center; and a perforated heating grid, centered on the geometric center, the heating grid extending between the central support and the outer peripheral frame, the heating grid being formed of a plurality of strands connected by nodes, the strands delimiting openings between the strands.

According to particular embodiments of the disclosure, the heating member also has one or more of the following features taken in isolation or in any combination that is technically possible:

the heating grid has a first face and a second face, the first face and the second face each having at least one flat area, the heating grid being deformed, preferably by stamping, so as to form a relief having an annular shape centered on the geometric center, the relief protruding with respect to the flat area of the first face and defining a recess with respect to the flat area of the second face;

the relief has a height of between one-fifteenth and one-fifth of the radius of the heating grid, preferably between one-twelfth and one-eighth of the radius of the heating grid and advantageously substantially equal to one-tenth of the radius of the heating grid;

the heating grid forms two successive annular reliefs in the radial direction, the reliefs having opposite concavities;

the heating grid is formed of a plurality of elongate heating elements, the elongate heating elements occupying a respective angular sector of the heating grid and being arranged in a zigzag pattern within that angular sector so as to form a succession of strands connected by nodes and being linked by said nodes to the elongate heating elements occupying adjacent angular sectors, and a plurality of outer connection legs connecting the elongate heating elements to the outer peripheral frame, each outer connection leg being capable of deforming to absorb radial thermal expansion of the heating grid during operation of the heating member;

each outer connection leg forms a lever arm.

each outer connection leg comprises a node connection portion, an elongated portion and an outer peripheral frame connection portion, the connection portions extending substantially radially, the elongated portion extending in a compensation direction, the compensation direction forming a compensation angle with the radial direction, the compensation angle being between 10° and 120°;

the heating member comprises an electrically conductive separation ring centered on the geometric center, the heating grid having a first mesh of strands between the separation ring and the outer peripheral frame and a second mesh of strands between the separation ring and the central support, the heating grid comprising a plurality of elongate heating elements in each mesh of strands;

the heating grid comprises, for the first mesh of strands, a plurality of outer connection legs connecting the elongate heating elements to the outer peripheral frame and a plurality of inner connection legs connecting the elongate heating elements to the separation ring, and the heating grid comprising, for the second mesh of strands, a plurality of outer connection legs connecting the elongate heating elements to the separation ring and a plurality of inner connection legs connecting the elongate heating elements to the central support;

the number of elongate heating elements per angular sector is greater in the first mesh of strands than in the second mesh of strands;

the separation ring has a width strictly greater than twice the width of a strand;

the heating grid has a structure adapted to avoid contact between the nodes during operation of the heating member;

the heating grid is adapted to deform along the axis so as to absorb some of the radial thermal expansion of the heating grid during operation of the heating member;

the heating member has elements other than the strands, adapted to absorb some of the radial thermal expansion of the heating grid during operation of the heating member;

the connection portion connecting to the outer peripheral frame of an outer connection leg extends in the same direction as the connection portion connecting to a node of the neighbouring outer connection leg.

The disclosure also relates to a device for purifying the exhaust gases of an internal combustion engine comprising at least one heating element as defined above.

The disclosure also relates to a combustion engine exhaust line, comprising a gas purification device as defined above.

The disclosure also relates to a vehicle characterized in that it comprises an exhaust line as defined above.

BRIEF DESCRIPTION OF THE DRAWINGS

Other characteristics and advantages of the disclosure will become apparent upon reading the following description, given only as an example and referencing the attached drawings, in which.

DETAILED DESCRIPTION

Figure 1:
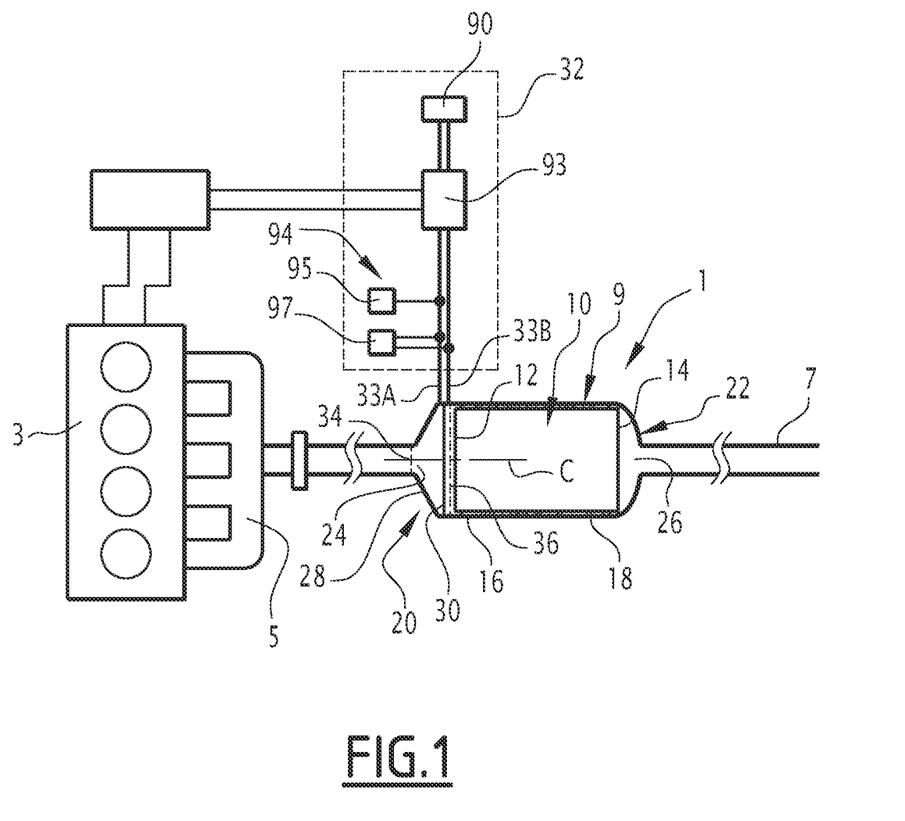
FIG. 1 is a simplified schematic depiction of an exhaust line incorporating a heating member according to the disclosure.

The exhaust line 1 shown in FIG. 1 is intended to be installed in a vehicle, typically a vehicle with an internal combustion engine 3. This vehicle is typically a motor vehicle, for example a car or a truck.

As shown in FIG. 1, the exhaust line 1 comprises a manifold 5 which collects the exhaust gases from the combustion chambers of the engine 3, and a nozzle 7 which allows the exhaust gases to be released into the atmosphere. The exhaust line 1 further comprises an exhaust gas purification device 9, fluidly interposed between the manifold 5 and the nozzle 7, so that the exhaust gas reaching the nozzle 7 has been purified by said purification device 9.

This purification device 9 comprises at least one exhaust gas purification member 10 having an upstream face 12 through which the exhaust gas enters the purification member 10, and a downstream face 14 through which the exhaust gas exits the purification member 10.

In this description, upstream and downstream are understood to be relative to the normal flow direction of the exhaust gases in the exhaust line 1.

The purification unit 10 is, for example, an SCR catalyst, a three-way catalyst, an oxidation catalyst, an SCRF particulate filter, or a NOx trap. It has an axis of symmetry (not shown).

The purification device 9 further comprises a sleeve 16 within which the purification member 10 is placed, and a holding sheet 18 interposed between the purification member 10 and the sleeve 16.

The purification device 9 further comprises a supply member or feeding member 20 for supplying the purification member 10 with exhaust gas from the manifold 5 and a collection member 22 for collecting the purified exhaust gas leaving the purification member 10 and directing it to the nozzle 7.

The feeding member 20 is typically in the form of an inlet cone or a mixer. It is fluidly interposed between the manifold 5 and the purification member 10, and comprises an exhaust gas inlet 24 fluidly connected to the manifold 5.

The collection member 22 is typically in the form of an outlet cone. It is fluidly interposed between the purification member 10 and the nozzle 7, and comprises an exhaust gas outlet 26 fluidly connected to the nozzle 7.

In particular, the feeding member 20 comprises a shroud 28 made of electrically conductive material, which delimits a passage for the exhaust gases, and a heating member 30 housed in the shroud 28. The feeding member 20 also comprises a power supply 32 with a first terminal 33A and a second terminal 33B for supplying electricity to the heating member 30.

The shroud 28 is electrically connected to the first terminal 33A of the power supply 32, typically by an electrical connection formed by a threaded rod welded to the shroud 28. Alternatively (not shown), the shroud 28 is electrically connected to earth by the same type of electrical connection.

As can be seen in FIG. 1, the shroud 28 has an upstream face 34 through which exhaust gases enter the feeding member 20, and a downstream face 36 through which exhaust gases exit the feeding member 20. The shroud 28 is adapted to guide gases entering from the upstream side 34 to the downstream side 36. The feeding member 20 is arranged relative to the purification member 10 so that the downstream side 36 of the shroud 28 substantially coincides with the upstream side 12 of the purification member 10.

The shroud 28 is a structural part adapted to withstand the mechanical stresses of an exhaust line without deforming.

The shroud 28 is attached to the sleeve 16, typically by welding, riveting or screwing.

The shroud 28 is tubular. The downstream face 36 of the shroud 28 is centered on an axis C which is substantially coincident with the axis of symmetry of the purification member 10.

Here, the cross-section of the downstream face 36 is circular. Alternatively, the cross-section of the downstream face 36 is polygonal or substantially elliptical.

Figure 2:
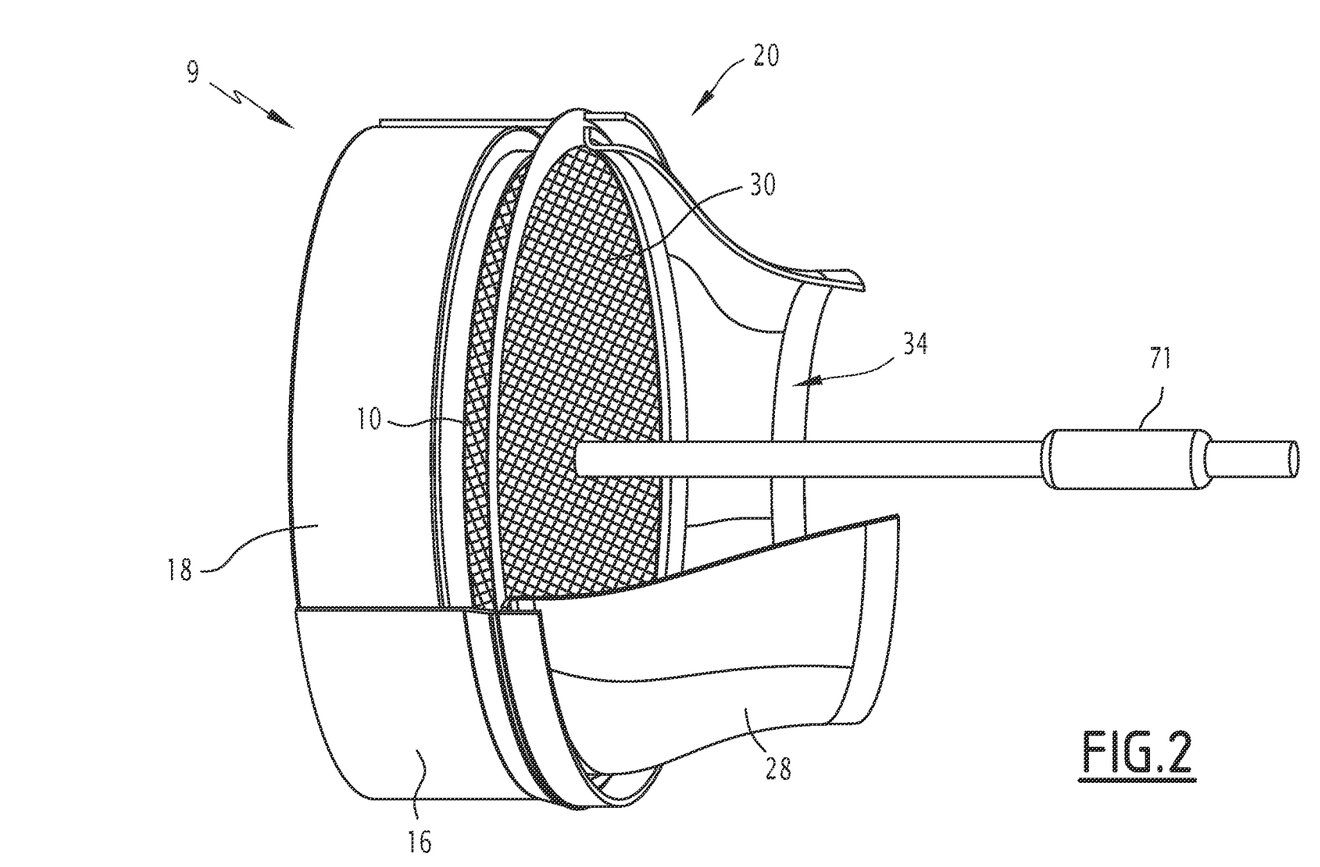
FIG. 2 is a perspective view of part of a purification device of the exhaust line of FIG. 1, the outer wall of which has been partially cut away so that the interior of the device is visible.

As can be seen in FIG. 2, the heating member 30 is housed in the shroud 28 opposite the downstream face 36, set back slightly towards the interior of the feeding member 20 with respect to that downstream face 36. "Set back slightly" means that the heating member 30 is at a distance of between 1 and 50 mm from the downstream face 36. The heating member 30 is thus placed opposite and at a distance from the upstream face 12 of the purification member 10.

The heating member 30 is substantially flat, i.e. it has an axial thickness less than 20%, and preferably less than 10% of its radial diameter.

Figure 3:
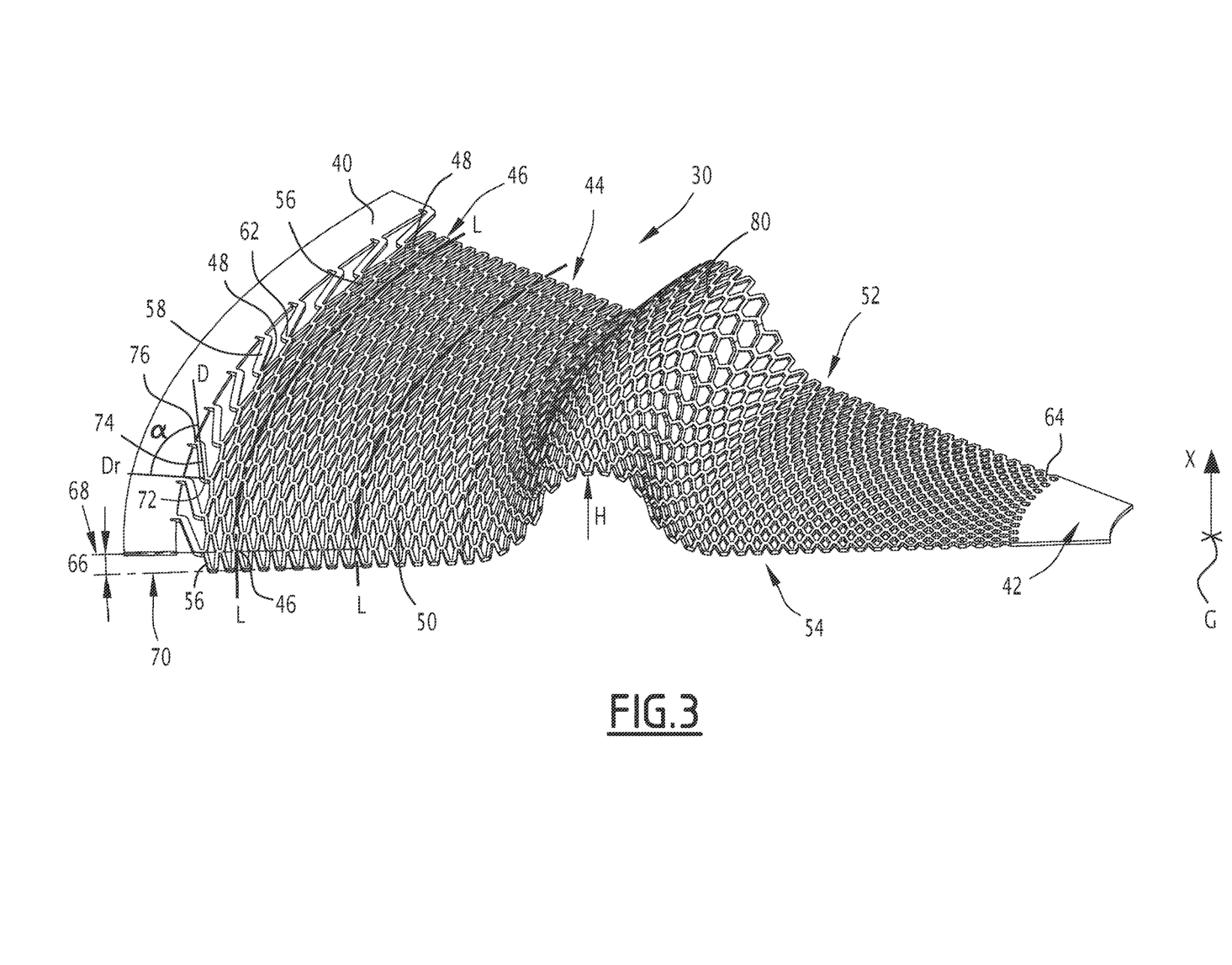
FIG. 3 is a perspective view of a portion of the heating member in a first embodiment of the disclosure.

With reference to FIG. 3, the heating member 30 comprises an outer peripheral frame 40, a central support 42 and a heating grid 44. The heating grid 44 is formed of a plurality of strands 46 connected by nodes 48, the strands 46 defining openings 50 between them.

The heating member 30 is made of a conductive material. It is preferably formed of one piece.

The heating member 30 is connected to the power supply 32, so that the power supply 32 is capable of carrying a current through the strands 46.

The conductive material is, for example, selected from iron-chromium-aluminium (FeCrAl) and its alloys, nickel-chromium (NiCr) and its alloys, stainless steel, Inconel®, or silicon carbide. For example, the material is Kanthal® A1, Nichrome® 80, or Nikrothal® 80.

The heating member 30 is typically made by cutting a sheet of conductive material. This cutting is done for example by laser, by fine-blanking, by chemical cutting, or by any other method that creates holes in the plate.

Alternatively, the heating member 30 is produced by additive manufacturing, in particular by three-dimensional printing.

Alternatively, the heating grid 44 of the heating member 30 is woven from threads of conductive material.

The heating member 30 is self-supporting.

The outer peripheral frame 40 is electrically conductive.

The outer peripheral frame 40 has a geometric center G and is symmetrical about a central axis X. The outer peripheral frame 40 has a closed contour.

In the following, the dimension of a member in a direction parallel to the direction of flow of the exhaust gas through the heating grid 44, i.e. perpendicular to the plane of the heating member 30, is referred to as the "thickness" of that member, and the smallest dimension of a member in the plane of the heating member 30, i.e. in a plane perpendicular to the direction of flow of the exhaust gas through the heating grid 44, is referred to as the "width" of that member. For the outer peripheral frame 40 and the central support 42, their width is measured in a radial direction through the geometric center G.

The outer peripheral frame 40 has for example a width greater than or equal to twice the width of each strand 46.

The outer perimeter frame 40 serves as a fastening ring. The outer peripheral frame 40 is welded, brazed or press-fitted into the shroud 28 so that it contacts the shroud 28 at its outer periphery. Thus, the outer peripheral frame 40 is at approximately the same electrical potential as the shroud 28.

The geometric center G is substantially aligned with the axis C, i.e. the geometric center G is at a distance from the axis C of less than 10 mm, advantageously less than 5 mm.

The central support 42 is centered on the geometric center G. Advantageously, the central support 42 is symmetrical about the central axis X.

The central support 42 is electrically conductive.

The central support 42 has, for example, a width greater than or equal to twice the width of each strand 46.

The central support 42 has a diameter less than 20% of the diameter of the outer peripheral frame 40.

The central support 42 is, for example, a washer made of conductive material, centered on the geometric center G. The washer is solid, except for a through hole formed in its center. Alternatively, the central support 42 contains cutouts.

As shown in FIG. 2, the central support 42, not visible in FIG. 2, is electrically connected to the second terminal 33B of the power supply 32 by an electrode 71 extending through the shroud 28 and electrically insulated from it. The central support 42 is in particular connected to said electrode 71 by screwing, welding, brazing or any other suitable method.

The electrode 71 is rigidly attached to the shroud 28.

Returning to FIG. 3, the heating grid 44 is a perforated heating grid. The heating grid 44 has a defined geometric shape around the geometric center G. For example, the heating grid 44 has a circular outer contour.

The heating grid 44 extends between the central support 42 and the outer peripheral frame 40.

This heating grid 44 is self-supporting.

The heating grid 44 is made of one material. It is made of a conductive material. In particular, it is integral with the outer peripheral frame 40 and the central support 42.

The heating grid 44 has a first face 52 and a second face 54. The first face 52 is, for example, a downstream face, the second face 54 is, for example, an upstream face. The first face 52 and the second face 54 are parallel to each other.

Advantageously, the first face 52 and the second face 54 each have at least one flat area.

Advantageously, the strands 46 do not overlap. Thus, the heating grid 44 has a thickness, measured between its first face 52 and its second face 54, which is substantially constant, and preferably constant. Advantageously, it has a thickness substantially equal to the thickness of the outer peripheral frame 40 and to that of the central support 42.

The heating grid 44 has for example a thickness of between 0.05 and 2 mm, preferably between 0.1 and 0.5 mm.

The strands 46 have the same width between the nodes 48. Note that on each strand 46, the smallest dimension is the thickness, the largest dimension is the length, and the third dimension is the width.

Advantageously, each node 48 has a first dimension, in a first radial direction defined from said geometrical center G and separating the node 48 into two parts of equal sections, and a second dimension in a second direction perpendicular to the first radial direction, such that the first dimension and/or the second dimension is greater than twice the width of each strand 46.

Each opening 50 is delimited by a contour without an angular point. For this purpose, the heating member 30 is cut in such a way that only curves are formed, without any angular points.

The openings 50 have a general quadrilateral shape, preferably a diamond shape, with a height defined along a radial direction running from the geometric center G, and a width along an arc of a circle perpendicular to that radial direction. For example, the width of each opening 50 is greater than its height. Alternatively, the height of each opening 50 is greater than its width. In another embodiment, the width and height of each opening are equal.

In the example described, the sensitive curves, to which attention must be paid in order not to form an angular point, are formed by the rounded corners of the openings 50.

In the following description, the rounded corners defined along the width of each opening are referred to as "first rounded corners", and the rounded corners defined along the height of each opening are referred to as "second rounded corners". The radii of curvature in the first and second rounded corners are selected according to the chosen appearance of the heating grid 44. For example, these radii of curvature are greater than half the width of each strand 46.

Advantageously, the strands 46 all have a constant thickness along their entire length. This feature ensures that the electrical current flows evenly along each strand 46, without creating a hot spot.

Each opening 50 has a recess at each of its second rounded corners. This recess results in an inversion of the radius of curvature of the opening's contour between the inside of the recess and the outside of the recess. More particularly, the recess is formed by a fillet connecting the contours of two strands 46 delimiting the opening 50, this fillet being tangent to each of these two contours.

More particularly, the heating grid 44 is formed of a plurality of elongate heating elements 56.

In FIG. 3, twenty elongate heating elements 56 are shown.

As shown in FIG. 3, each elongate heating element 56 has a first end 62 and a second end 64 opposite one another. The first end 62 is connected to the peripheral frame 40, and the second end 64 is connected to the central support 42.

The first end 62 is thus electrically connected to the first terminal 33A of the power supply 32, and the second end 64 is electrically connected to the second terminal 33B of the power supply 32. Therefore, when the power supply 32 is active, there is an electrical potential difference between the first end 62 and the second end 64 of each elongate heating element 56. This electrical potential difference is a function of the potential difference between terminals 33A, 33B of the power supply 32.

The elongate heating elements 56 occupy a respective angular sector 66 of the heating grid 44 about the geometric center G. This angular sector 66 is defined between a first radius 68 and a second radius 70 each extending from the second end 64 to the first end 62.

The angular sectors 66 occupied by the elongate heating elements 56 are adjacent to each other. Thus, each angular sector 66 occupied by an elongate heating element 56 is interposed between first and second neighbouring angular sectors 66 each occupied by a respective elongate heating element 56, the first radius 68 of said angular sector 66 being conflated with the second radius 70 of the first neighbouring angular sector 66, and the second radius 70 of said angular sector 66 being conflated with the first radius 68 of the second neighbouring angular sector 66.

Each elongate heating element 56 is formed by joining together a plurality of the strands 46 described above and is arranged in a zigzag pattern within the angular sector 66 which it occupies so as to form a succession of strands 46 connected by nodes 48. The elongate heating elements 56 are linked by said nodes 48 to the elongate heating elements 56 occupying the adjacent angular sectors 66.

Each strand 46 extends from the first radius 68 to the second radius 70.

Advantageously, the strands 46 of an elongate heating element 56 are evenly angularly distributed across the heating grid 44. In addition, the distribution of the strands 46 of an elongate heating element 56 is, for example, constant pitch. The distance between two successive strands 46 measured in a radial direction is called the "pitch". Alternatively, the distribution of the strands 46 is variable pitch.

All nodes 48 are arranged on a plurality of closed-contour isopotential lines L. Two of these lines are shown in FIG. 3. The isopotential lines L are approximately centered on the geometric center G.

All nodes 48 at the same electrical potential are placed on the same isopotential line L. It is possible that some of the isopotential lines L are conflated.

Here, the isopotential lines L all have an increasing average diameter as the electric potential decreases.

During operation of the heating member 30, the temperature of the heating grid 44 increases. For example, the temperature of the heating grid 44 increases from the ambient temperature in the heating member 30, approximately 30° or 50°, to 1000° C. This temperature increase causes radial thermal expansion of the heating grid 44. The radial thermal expansion causes, for example, a displacement of the nodes 48 in the radial direction of about 0.5 mm.

The heating grid 44 has a structure adapted to prevent the aforementioned thermal expansion from causing contact between the nodes 48 during operation of the heating member 30.

To this end, the heating grid 44 has a plurality of outer connection legs 58 connecting the elongate heating elements 56 to the outer peripheral frame 40. In particular, the first end 62 of each elongate heating element 56 is linked to an outer connection leg 58. In FIG. 3, ten outer connection legs 58 are shown.

Each outer connection leg 58 connects a node 48 between two adjacent elongate heating elements 56 to the outer peripheral frame 40.

The outer connection legs 58, as shown in FIG. 3, are different elements from the strands 46 and are adapted to absorb some of the radial thermal expansion of the heating grid 44 during the operation of the heating member 30.

To this end, according to a first embodiment of the disclosure and as shown in FIG. 3, each outer connection leg 58 is capable of deforming to absorb the radial thermal expansion of the heating grid 44 during the operation of the heating member 30.

In the example shown in FIG. 3, each outer connection leg 58 forms a lever arm for this purpose.

Each outer connection leg 58 comprises a connection portion 72 connecting to a node 48, an elongated portion 74 and a connection portion 76 connecting to the outer peripheral frame 40. The connection portions 72, 76 extend substantially in a radial direction Dr. The elongated portion 74 extends along a compensation direction D. The compensation direction D forms a compensation angle α with the radial direction Dr.

The compensation angle α is between 10° and 120°, preferably between 20° and 90°, even more preferably between 40° and 70°, and ideally between 45° and 60°.

In the example shown in FIG. 3, the connection portion 76 connecting to the outer peripheral frame 40 of an outer connection leg 58 extends in the same radial direction as the connection portion 72 connecting to a node 48 of the neighbouring outer connection leg 58. In other words, each connection portion 76 connecting to the outer peripheral frame 40, belonging to a first outer connection leg 58, extends as an extension of a connection portion 72 connecting to a node 48 belonging to a second outer connection leg 58.

Alternatively, and preferably, the connection portion 72 connecting to a node 48 of an outer connection leg 58 and the connection portion 76 connecting to the outer peripheral frame 40 of the neighbouring outer connection leg 58 do not face each other in order to limit the risk of touching the connection portion 76 of the neighbouring outer connection leg 58 when the connection portion 72 connecting to a node 48 moves towards the outer peripheral frame 40.

The structure of the outer connection legs 58 is such that the resultant expansion forces bend each outer connection leg 58, so as to rotate the elongated portion 74 by an angle less than the compensation angle α. The outer connection leg 58 then acts as a spring and prevents contact between the strands 46 or between the nodes 48.

Such outer connection legs 58 forming a lever arm provide elasticity to the periphery of the heating grid 44. They compensate for radial thermal expansion by providing radial flexibility to absorb expansion at the periphery of the heating grid 44.

In addition, such outer connection legs 58 are easy to manufacture when making the heating grid 44 as they can be included in the cutting pattern.

In the embodiment shown in FIG. 3, the heating grid 44 is further adapted to deform along the axis X so as to absorb a portion of the radial thermal expansion of the heating grid 44 during the operation of the heating member 30.

For this purpose, the heating grid 44 has a relief 80.

In particular, the heating grid 44 is deformed to form the relief 80. The relief 80 has an annular shape centered on the geometric center G. The relief 80 projects from the flat area of the first face 52 and defines a depression in relation to the flat area of the second face 54.

The relief 80 has a height H, measured in a direction parallel to the axis X, of between one-fifteenth and one-fifth of the radius of the heating grid 44, preferably between one-twelfth and one-eighth of the radius of the heating grid 44 and advantageously equal to approximately one-tenth of the radius of the heating grid 44.

For example, the height H of the relief is 5 mm for a heating grid 44 with a radius of 50 mm.

This improves the mechanical strength of the heating grid 44. Such a relief 80 makes it possible to stiffen the heating grid 44 along the axis X while increasing the radial flexibility of the heating grid 44 so as to compensate for some of the radial thermal expansion.

The relief 80 is produced, for example, by stamping the heating grid 44.

Such a deformed relief 80 in the axial direction X compensates for radial thermal expansion.

The position of the relief 80 allows the initiation of thermal expansion to be controlled by the fold created.

In a variant not shown, the heating grid 44 forms two successive annular reliefs 80 in the radial direction, the reliefs 80 having opposite concavities. The reliefs 80 together form an undulating profile. Each relief 80 has, for instance, a height H, measured in a direction parallel to the axis X, of between one-fifteenth and one-fifth of the radius of the heating grid 44, preferably between one-twelfth and one-eighth of the radius of the heating grid 44 and advantageously equal to substantially one-tenth of the radius of the heating grid 44.

It should be noted that the relief 80 and the outer connection legs 58 are independently usable solutions. Each of these solutions helps to improve the performance of the heating member 30 by improving the radial flexibility of the heating grid 44 and thereby helping to absorb the thermal expansion of the heating member 30.

In the example shown in FIG. 3, the first end 62 is indirectly connected to the outer peripheral frame 40 by the outer connection leg.

In an embodiment not shown, the first end 62 is directly connected to the outer peripheral frame 40.

Returning to FIG. 1, the power supply 32 comprises a source 90 of electrical energy, such as the vehicle's electric battery, or a supercapacitor device.

The electrical power source 90 is typically adapted to provide direct or chopped current at a vehicle-dependent voltage (e.g. 12, 48 or 400 volts).

The power supply 32 also includes a controller 93 arranged to control the supply of electrical power to the heating member 30.

The controller 93 comprises, for example, an information processing unit comprising a processor and a memory associated with the processor. Alternatively, the controller 93 is implemented as programmable logic components, such as Field-Programmable Gate Arrays (FPGAs), or as dedicated integrated circuits, such as Application-Specific Integrated Circuits (ASICs).

In particular, the controller 93 is configured to select the voltage and current supplied by the power supply 32 to the heating member 30, so as to maintain the heating power and/or electrical power consumption within a specified range.

Typically, the controller 93 controls the heating by Pulse Width Modulation (PWM).

The power supply 32 further comprises a member 94 for acquiring the amperage of the electric current supplying the elongate heating elements 56 and the electric voltage across the elongate heating elements 56.

This member 94 is of any suitable type.

For example, the member 94 is an acquisition device that comprises a sensor 95 for measuring electric current and a sensor 97 for measuring electric voltage. Alternatively, the electric current and the electric voltage are obtained by calculation, from information retrieved from the controller 93.

Advantageously, the controller 93 is configured to control the temperature of the elongate heating elements 56, monitor the proper operation of the elongate heating elements 56 or of the outer or inner connection legs, determine the temperature of the exhaust gases when the heating member 30 is no longer being used to heat the purification member 10, and determine the flow rate of exhaust gases through the purification member 10 once the heating member 30 is no longer being used to heat the purification member 10. For this purpose, the controller 93 is, for example, configured to implement the control programs described in FR 3 065 027 A1.

Figure 4:
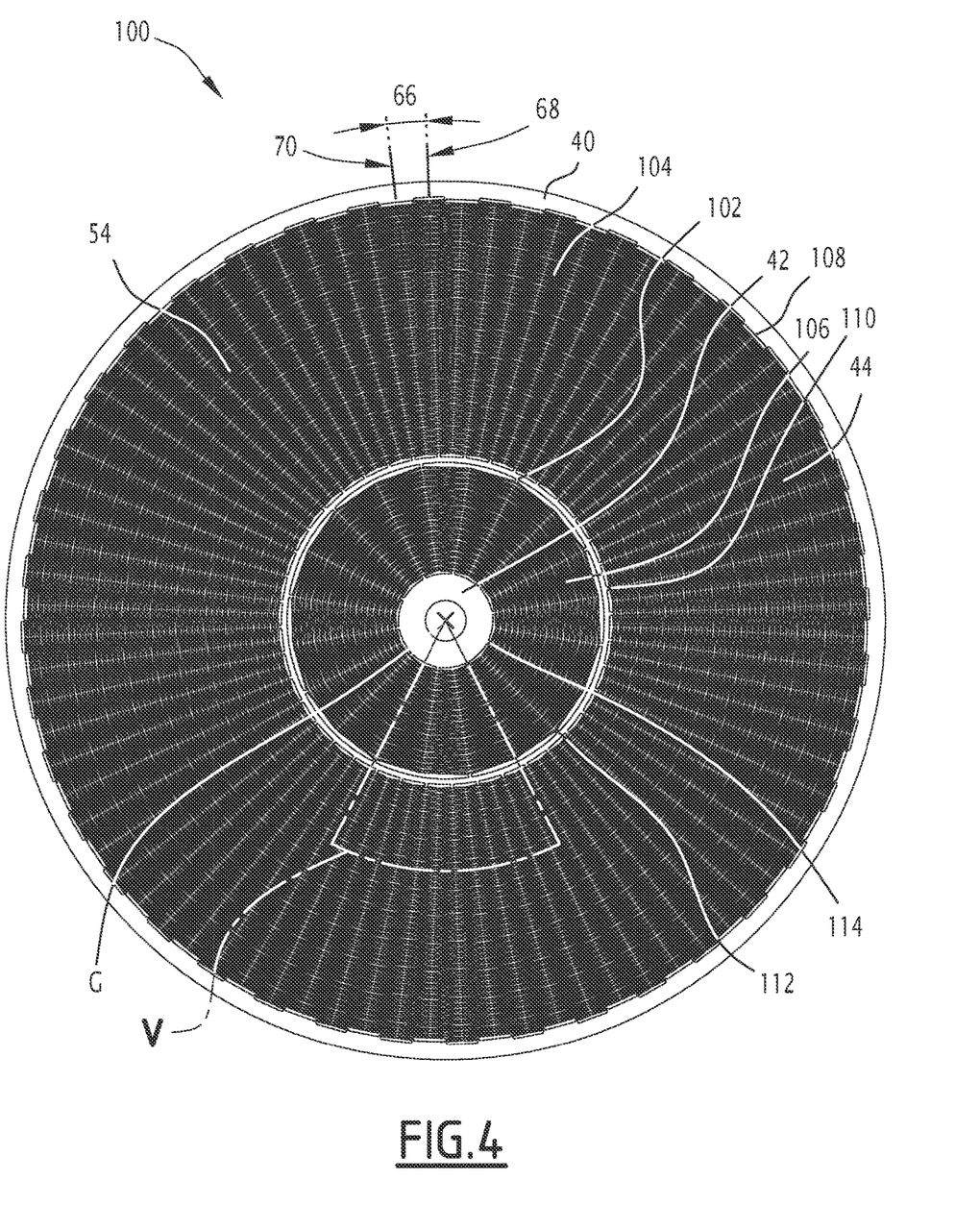
FIG. 4 is a plan view of a heating member in a second embodiment of the disclosure.
Figure 5:
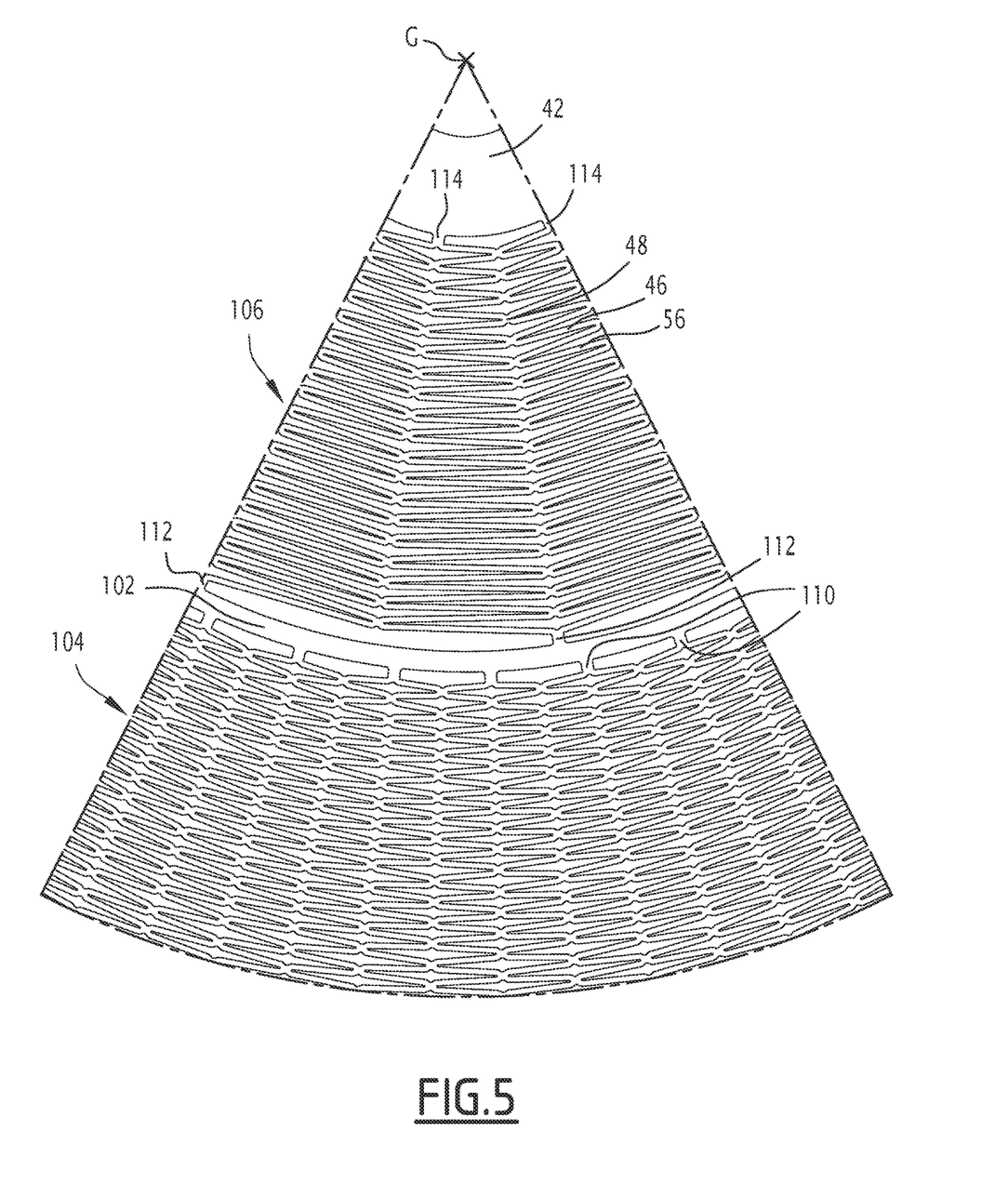
FIG. 5 is a detailed plan view of a detail marked V of FIG. 4.

With reference to FIGS. 4 and 5, a second heating member 100 is shown. Only the differences from the previously described heating member 30 are stated. In this embodiment, the heating member 100 comprises a separation ring 102 and the heating grid 44 has a first mesh 104 of strands 46 between the separation ring 102 and the outer peripheral frame 40 and a second mesh 106 of strands 46 between the separation ring 102 and the central support 42.

The separation ring 102 is electrically conductive. The separation ring 102 is centered on the geometric center G.

The separation ring 102 has an outer and an inner contour. The distance between the outer contour and the inner contour measured perpendicular to the direction of flow of the exhaust gas through the heating grid 44, i.e. in the plane of the heating member 30, is referred to as "width".

The separation ring 102 is solid between the outer and the inner contour.

The separation ring 102 has a width strictly greater than twice the width of a strand 46.

The heating grid 44 comprises in each mesh 104, 106 of strands 46 a plurality of elongate heating elements 56 as described for the first embodiment.

In addition, the grid 44 comprises, for the first mesh 104 of strands 46, a plurality of outer connection legs 108 connecting the heating elements 56 to the outer peripheral frame 40 and a plurality of inner connection legs 110 connecting the heating elements to the separation ring 102.

In addition, the grid 44 comprises, for the second mesh 106 of strands 46, a plurality of outer connection legs 112 connecting the heating elements 56 to the separation ring 102 and a plurality of inner connection legs 114 connecting the heating elements 56 to the central support 42.

The number of elongate heating elements 56 is greater in the first mesh 104 than in the second mesh 106. The number of angular sectors 66 is greater in the first mesh 104 than in the second mesh 106.

The number of elongate heating elements 56 per angular sector is greater in the first mesh 104 than in the second mesh 106.

The second mesh 106 thus appears denser than the first mesh 104.

In the example shown in FIG. 4, the second mesh 106 comprises twenty elongate heating elements 56 for 360° and the first mesh 104 comprises eighty elongate heating elements 56 for 360°. The first mesh 104 thus comprises four times as many elongate heating elements 56 as the second mesh 106.

Alternatively (not shown), the first mesh 104 comprises twice as many elongate heating elements 56 as the second mesh 106.

In a further alternative, the first mesh 104 comprises N times as many elongate heating elements 56 as the second mesh 106, where N is an integer strictly greater than 1.

Such a structure makes it possible to have multiple stages of different resistances. This allows the electrical resistance of the heating grid 44 and the exchange surface to be adjusted by varying the diameter of the separation ring 102.

In addition, this allows for more design freedom. Finally, the structure improves the mechanical strength of the heating grid 44 by stiffening it.

In particular, this allows the electrical resistance to be adjusted or set according to the desired supply voltage for good mechanical strength and a suitable temperature profile.

In one embodiment, the heating member 100 comprises a plurality of concentric separation rings 102, the heating grid 44 further defining a different mesh between each separation ring 102.

Thanks to the above-described disclosure, it is thus possible to obtain a heating member 30, 100 with good mechanical strength. In addition, the mechanical strength obtained or the dissipation of radial thermal expansion prevents the occurrence of hot spots which would result in local weakening of the heating member 30, 100, to the point of potentially breaking.

The different solutions described for providing greater strength to the heating member 30, 100 are compatible and can be used together or independently.

In an embodiment not shown, the heating grid 44 of the heating member 100 according to the second embodiment comprises a relief 80, as described for the first embodiment.

In an embodiment not shown, the elongate heating elements 56 of the first mesh 104 are connected to the outer peripheral frame 40 and/or the elongate heating elements 56 of the second mesh 106 are connected to the separation ring 102 by outer connection legs 58 as described for the first embodiment.

Although various embodiments have been disclosed, a worker of ordinary skill in this art would recognize that certain modifications would come within the scope of this disclosure. For that reason, the following claims should be studied to determine the true scope and content of this disclosure.

The invention claimed is:

1. A heating member for a vehicle exhaust gas purification device comprising:
   an electrically conductive outer peripheral frame having a geometric center and being symmetrical about an axis;
   an electrically conductive central support centered on the geometric center; and
   a perforated heating grid centered on the geometric center, the perforated heating grid extending between the electrically conductive central support and the electrically conductive outer peripheral frame, the perforated heating grid being formed of a plurality of strands connected by nodes, the plurality of strands delimiting openings between the plurality of strands, wherein the heating member comprises an electrically conductive separation ring centered on the geometric center, the perforated heating grid having a first mesh of strands from the plurality of strands, the first mesh of strands being between the electrically conductive separation ring and the electrically conductive outer peripheral frame, and a second mesh of strands from the plurality of strands, the second mesh of strands being between the electrically conductive separation ring and the electrically conductive central support, the perforated heating grid comprising in each of the first and second mesh of strands a plurality of elongate heating elements.

2. The heating member according to claim 1, wherein the perforated heating grid has a first face and a second face, the first face and the second face each having at least one flat area, the perforated heating grid being deformed to form a relief having an annular shape centered on the geometric center, the relief protruding with respect to the at least one flat area of the first face and defining a recess with respect to the at least one flat area of the second face.

3. The heating member according to claim 2, wherein the relief has a height of between one-fifteenth and one-fifth of a radius of the perforated heating grid.

4. The heating member according to claim 2, wherein the perforated heating grid forms two successive annular reliefs in a radial direction, the two successive annular reliefs having opposite concavities.

5. The heating member according to claim 2, wherein the relief has a height of between one twelfth and one eighth of a radius of the perforated heating grid.

6. The heating member according to claim 2, wherein the relief has a height equal to one tenth of a radius of the perforated heating grid.

7. The heating member according to claim 1 wherein
   the perforated heating grid comprises, for the first mesh of strands, a first plurality of outer connection legs connecting the plurality of elongate heating elements to the electrically conductive outer peripheral frame and a first plurality of inner connection legs connecting the plurality of elongate heating elements to the electrically conductive separation ring, and
   the perforated heating grid comprising, for the second mesh of strands, a second plurality of outer connection legs connecting the plurality of elongate heating elements to the electrically conductive separation ring and a second plurality of inner connection legs connecting the plurality of elongate heating elements to the electrically conductive central support.

8. The heating member according to claim 1 wherein a number of elongate heating elements per angular sector is greater in the first mesh of strands than in the second mesh of strands.

9. The heating member according to claim 8, wherein the electrically conductive separation ring has a width strictly greater than twice a width of a strand from the plurality of strands.

10. A purification device for purifying exhaust gases of an internal combustion engine comprising at least one heating member according to claim 1.

11. A heating member for a vehicle exhaust gas purification device comprising:
    an electrically conductive outer peripheral frame having a geometric center and being symmetrical about an axis;
    an electrically conductive central support centered on the geometric center; and
    a perforated heating grid centered on the geometric center, the perforated heating grid extending between the electrically conductive central support and the electrically conductive outer peripheral frame, the perforated heating grid being formed of a plurality of strands connected by nodes, the plurality of strands delimiting openings between the plurality of strands, wherein the perforated heating grid is formed of a plurality of elongate heating elements, the plurality of elongate heating elements occupying a respective angular sector of the perforated heating grid and being arranged in a zigzag pattern within that respective angular sector to form a succession of strands from the plurality of strands that are connected by the nodes, and being linked by the nodes to the plurality of elongate heating elements occupying adjacent angular sectors, and including a plurality of outer connection legs connecting the plurality of elongate heating elements to the electrically conductive outer peripheral frame, each outer connection leg being capable of deforming to absorb radial thermal expansion of the perforated heating grid during operation of the heating member.

12. The heating member as claimed in claim 11, wherein each outer connection leg forms a lever arm.

13. The heating member according to claim 11, wherein each outer connection leg comprises a first connection portion connecting to one node from the nodes, an elongate portion, and a second connection portion connecting to the electrically conductive outer peripheral frame, the first and second connection portions extending radially, the elongate portion extending in a compensation direction, the compensation direction forming a compensation angle with a radial direction, the compensation angle being between 10° and 120°.

* * * * *